United States Patent Office 2,964,539
Patented Dec. 13, 1960

2,964,539

17α-HYDROXY-21-FLUORO-4-PREGNENE-3,11,20-TRIONE

Clarence G. Bergstrom, Chicago, Ill., assignor to G. D. Searle & Co., Chicago, Ill., a corporation of Delaware No Drawing. Filed Aug. 3, 1956, Ser. No. 602,078

1 Claim. (Cl. 260—397.45)

This invention relates to a hormonally-active substance of novel properties. It is specifically concerned with 17α-hydroxy-21-fluoro-4-pregnene-3,11,20-trione of the structural formula

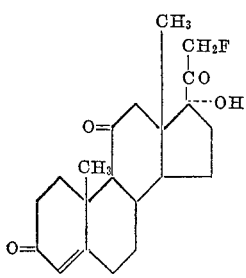

In one of the methods for the manufacture of 17α-hydroxy-21-fluoro-4-pregnene-3,11,20-trione, the corresponding chloro derivative, 17α-hydroxy-21-chloro-4-pregnene-3,11,20-trione, is heated with an alkali metal iodide such as sodium iodide or potassium iodide in a lower alkanone such as acetone or butanone, and the crude 17α-hydroxy-21-iodo-4-pregnene-3,11,20-trione obtained from the reaction mixture is heated under reflux with silver fluoride in acetonitrile, whereby the desired halogen interchange occurs.

In an alternate method for the manufacture of 17α-hydroxy-21-fluoro-4-pregnene-3,11,20-trione, 11β,17α-dihydroxy-21-fluoro-4-pregnene-3,20-dione, described in copending application Serial No. 590,343, filed June 11, 1956, now abandoned, is subjected to the action of an oxidizing reagent such as chromium trioxide in pyridine or chromium trioxide in acetic acid, whereby the trione results.

The composition of this invention has hormonal properties useful in the regulation of carbohydrate and mineral metabolism. Its usefulness in endocrine therapy is largely in consequence of the fact that it produces pharmacological results distinctly different from those produced by adrenocortical agents to which it is chemically related. Thus, it exhibits the eosinopenic effect characteristic of cortisone and hormones of the cortisone type, but it also inhibits the liver deposition of glycogen produced by cortisone. 17α-hydroxy-21-fluoro-4-pregnene-3,11,20-trione is also a valuable regulator of mineral excretion, being effective, for example, in causing sodium retention without significantly affecting the urinary excretion of potassium.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees Centigrade (° C.) and quantities of materials in parts by weight.

Example 1

A mixture of 1.95 parts of 17α-hydroxy-21-chloro-4-pregnene-3,11,20-trione, 6 parts of sodium iodide and 480 parts of acetone is heated under reflux for 1 hour, after which the acetone is removed by distillation under reduced pressure and the residue is partitioned between ethyl acetate and dilute sodium thiosulfate solution. The organic phase is washed with several portions of water, dried over sodium sulfate, filtered and concentrated to dryness to afford a residue of crude 17α-hydroxy-21-iodo-4-pregnene-3,11,20-trione, suitable for use in the following operation without further purification.

The crude 17α-hydroxy-21-iodo-4-pregnene-3,11,20-trione as prepared immediately hereinabove and 2 parts of commercial silver fluoride are added to 400 parts of anhydrous acetonitrile, and the mixture is heated under reflux for 1 hour. It is then filtered through diatomaceous earth in order to remove undissolved material. The clear filtrate is concentrated to about one-fifth of its original volume; water (about 300 parts) is added and crystallization is induced. When separation of the solid product is complete, the mixture is filtered and the product obtained recrystallized from acetone. There is thus obtained 17α-hydroxy-21-fluoro-4-pregnene-3,11,20-trione which melts at about 263–268° C. and has a specific rotation of about 216° in dioxane solution.

Example 2

A total of 2 parts of chromium trioxide is added, gradually and in small portions, to 20 parts of pyridine, with external cooling as required to maintain the temperature at or below 30° C. To the oxidizing reagent thus obtained there is added a solution of 2 parts of 11β,17α-dihydroxy-21-fluoro-4-pregnene-3,20-dione in 65 parts of pyridine, and the reaction mixture is allowed to stand for 20 hours at about 25° C., with occasional stirring. It is then partitioned between 2000 parts of a 50 volume percent solution of benzene in ether, and 700 parts of water. The separated benzene-ether phase is washed with several small portions of water and concentrated to dryness in a vacuum. The non-volatile residue is crystallized several times from acetone, whereby there is obtained 17α-hydroxy-21-fluoro-4-pregnene-3,11,2-trione, identical with the product of Example 1.

What is claimed is:

A compound represented by the formula:

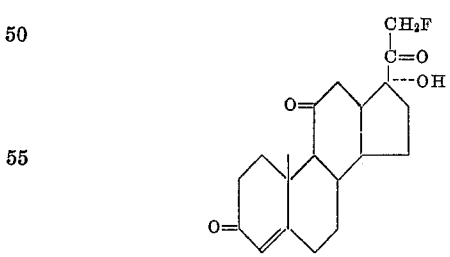

References Cited in the file of this patent

UNITED STATES PATENTS

| | | |
|---|---|---|
| 2,596,563 | Kaufmann | May 13, 1952 |
| 2,684,968 | Bergstrom | July 27, 1954 |
| 2,713,587 | Bergstrom | July 19, 1955 |
| 2,734,065 | Hogg | Feb. 7, 1956 |
| 2,768,191 | Warnant | Oct. 23, 1956 |

OTHER REFERENCES

Tannhauser et al.: J. Am. Chem. Soc., vol. 78, pages 2658–59 (June 5, 1956).